(12) United States Patent  (10) Patent No.: US 9,721,042 B2
Lenord et al.  (45) Date of Patent: Aug. 1, 2017

(54) SYSTEM AND METHOD FOR USE OF FUNCTION-BASED MECHATRONIC OBJECTS

(75) Inventors: Matthias Lenord, Fountain Valley, CA (US); Raymond Kok, East Windsor, NJ (US); Xiaoxiang Shi, Irvine, CA (US)

(73) Assignee: SIEMENS PRODUCT LIFECYCLE MANAGEMENT SOFTWARE, INC., Plano, TX (US)

( * ) Notice: Subject to any disclaimer, the term of this patent is extended or adjusted under 35 U.S.C. 154(b) by 1866 days.

(21) Appl. No.: 12/760,259

(22) Filed: Apr. 14, 2010

(65) Prior Publication Data

US 2011/0055088 A1  Mar. 3, 2011

Related U.S. Application Data

(60) Provisional application No. 61/238,414, filed on Aug. 31, 2009.

(51) Int. Cl.
*G06Q 10/00*  (2012.01)
*G06F 17/50*  (2006.01)
*G06Q 10/10*  (2012.01)

(52) U.S. Cl.
CPC ......... *G06F 17/50* (2013.01); *G06Q 10/101* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 4,809,656 A | 3/1989 | Suzuki | |
| 5,980,096 A | 11/1999 | Thalhammer-Reyero | |
| 6,011,830 A | 1/2000 | Sasin et al. | |
| 6,032,193 A | 2/2000 | Sullivan | |
| 6,185,469 B1 | 2/2001 | Lewis et al. | |
| 6,220,743 B1* | 4/2001 | Campestre et al. | 700/97 |
| 6,650,954 B2* | 11/2003 | Zulpa et al. | 700/107 |
| 6,778,863 B1 | 8/2004 | Lienhard et al. | |
| 6,789,054 B1 | 9/2004 | Makhlouf | |
| 6,957,551 B2* | 10/2005 | Moeller et al. | 62/643 |
| 7,363,204 B2* | 4/2008 | Colombo | 703/7 |
| 7,904,280 B2 | 3/2011 | Wood | |
| 8,010,333 B2 | 8/2011 | Colombo et al. | |

(Continued)

OTHER PUBLICATIONS

Choley, et al. In Proceedings of the 2009 IEEE International Conference on Mechatronics, Apr. 14, 2009 (pp. 1-6); Magazine.

(Continued)

*Primary Examiner* — Paul R Fisher

(57) ABSTRACT

A system, method, and computer readable medium. A method includes receiving a selection of a function-based mechatronic object, the function-based mechatronic object including a plurality of linked requirements and functional information. The method includes instantiating the function-based mechatronic object as a product-specific mechatronic object and evaluating a plurality of linked requirements and functional information for the product-specific mechatronic object. The method includes assigning product-specific specifications to the functional information of the product-specific mechatronic object and storing the product-specific mechatronics object, including the linked requirements and functions.

21 Claims, 4 Drawing Sheets

(56) References Cited

U.S. PATENT DOCUMENTS

| | | | |
|---|---|---|---|
| 8,078,445 B2 | 12/2011 | Pritchard et al. | |
| 2002/0128810 A1* | 9/2002 | Craig et al. | 703/17 |
| 2003/0024243 A1 | 2/2003 | Gianchandani et al. | |
| 2004/0158442 A1 | 8/2004 | Kondo | |
| 2007/0192076 A1 | 8/2007 | Boutin | |
| 2008/0010328 A1* | 1/2008 | Moeller et al. | 708/200 |
| 2008/0039959 A1 | 2/2008 | Fister et al. | |
| 2008/0109084 A1 | 5/2008 | Maitland et al. | |
| 2008/0208363 A1 | 8/2008 | Grgic et al. | |
| 2008/0264507 A1 | 10/2008 | Chu | |
| 2010/0082314 A1 | 4/2010 | Pritchard et al. | |
| 2010/0299167 A1 | 11/2010 | Mulvanny | |
| 2011/0055088 A1 | 3/2011 | Lenord et al. | |
| 2011/0153056 A1 | 6/2011 | Bohm et al. | |

OTHER PUBLICATIONS

Sudarsan, et al. In Computer-Aided Design, vol. 37, No. 13, Nov. 1, 2005 (pp. 1399-1411); Magazine.

Secchi, et al. In IEEE Transactions on Automation Science and Engineering, vol. 4, No. 1, Jan. 1, 2007 (pp. 105-113); Magazine.

PCT International Search Report dated Apr. 20, 2011 corresponding to PCT International Application No. PCT/US2010/047081 filed Aug. 30, 2010 (11 pages).

Office Action mailed Jul. 3, 2013, as issued in U.S. Appl. No. 12/760,281, filed Apr. 14, 2010.

Office Action mailed Jan. 13, 2014, as issued in U.S. Appl. No. 12/760,281, filed Apr. 14, 2010.

Plateaux R., et al.; "Towards an Integrated Mechatronic Design Process"; 2009, IEEE, pp. 1-6.

S. Kojima, et al.; "Assembly Model Data in Robot Cell Systems"; 1998, IEEE, pp. 655-660.

* cited by examiner

SYSTEM AND METHOD FOR USE OF FUNCTION-BASED MECHATRONIC OBJECTS

CROSS-REFERENCE TO RELATED APPLICATIONS

This application claims the benefit of the filing date of U.S. Provisional Patent Application 61/238,414, filed Aug. 31, 2009, for "System, Method, and Computer Program Product for Functional Mechatronic Objects", which is hereby incorporated by reference.

This application includes some subject matter in common with commonly-assigned, concurrently-filed U.S. patent application Ser. No. 12/760,281 for "System and Method for Creation of Function-Based Mechatronic Objects", which is hereby incorporated by reference.

TECHNICAL FIELD

The present disclosure is directed, in general, to systems and methods for use in computer-aided design, manufacturing, engineering, prototype/test, maintenance, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, maintenance, and disposal of various products. Improved systems are desirable.

SUMMARY OF THE DISCLOSURE

Various embodiments include a system, method, and computer readable medium. A method includes receiving a selection of a function-based mechatronic object, the function-based mechatronic object including a plurality of linked requirements and functional information. The method includes instantiating the function-based mechatronic object as a product-specific mechatronic object and evaluating a plurality of linked requirements and functional information for the product-specific mechatronic object. The method includes assigning product-specific specifications to the functional information of the product-specific mechatronic object and storing the product-specific mechatronics object, including the linked requirements and functions.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In general, mechatronics refers the synergistic combination of mechanical engineering, electrical/electronic engineering, computer engineering, control engineering, systems design engineering, and other technical disciplines to create, design and manufacture useful products. The concept phase in the overall design process of a mechatronics system is the first time where the architect thinks about the physical implementation. The architect must ensure that the implementation is conformant with the requirements and has a basic design structure that enables an efficient detailed design and production.

Today there is no integrated mechanism in place to seamlessly trace requirements down to the multi-disciplinary design and implementation of a given product and/or system. The collaboration of multi disciplines is difficult because there is no joint data structure in place that is a kind of interlink between the disciplinary data structures.

Some systems are capable of maintaining requirements, functions and disciplinary data in a data base. One can match the various data structures by creating link between items in the data base from a pure data point of view. There is no specific design context for interdisciplinary concept design in conventional systems.

In conventional systems each item has a specific design context which makes the design of multi-disciplinary product designs hard to grasp for designers/engineers. Prior systems just look at items as data objects that can be managed in a data base. This makes it impossible to support a creative design process required to produce a mechatronics concept design.

Disclosed embodiments include systems and methods that effectively capture interdisciplinary knowledge and reuse this knowledge in a mechatronics design context, as reusable function-based mechatronic objects.

Figure 1:
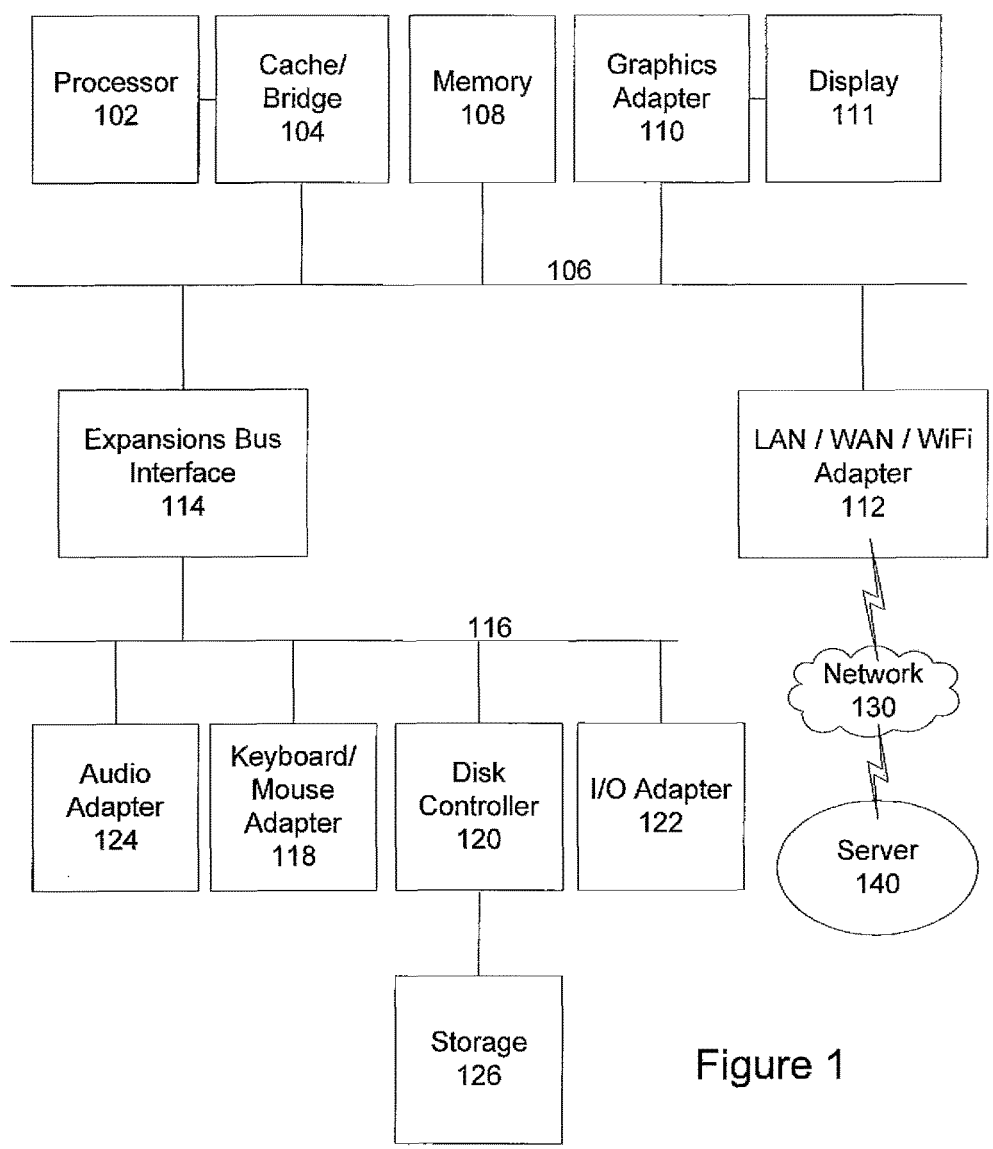
FIG. 1 depicts a block diagram of a data processing system in which an embodiment can be implemented in accordance with disclosed embodiments.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include new systems engineering processes that close the gap between requirements engineering and discipline specific implementation through the ability to store the functional model which provides a discipline-independent definition of a system's functions which can be mapped to multiple disciplines for implementation. These include systems and methods for employing a reusable function-based mechatronics object to capture and effectively reuse all data that are relevant to design the concept of a mechatronics system in one file. Such a mechatronics object can include data for 3D design including sub assemblies, kinematics and dynamics, logical behavior of the object including programming code, sensors and actuators to control the unit, sequence of operations (offering the capability of the "compound" operation), continuous behavior described in continuous functions, and other data as described herein. Such a mechatronics object can be created, maintained, edited, and used/reused by using a system such as data processing system 100.

Various embodiments include user interactions to provide a reusable mechatronics component that can include geometries, kinematics and dynamics for a detailed 3D-design, a sensor-actuator list for an electrical layout, a behavior description of the machine for the automation engineering, and simple simulation models for design verification, among other data.

A reusable mechatronics component as described herein can include one or more basic functions, including:

Functional Design: the component can facilitate a functional design approach by supporting the easy integration into an existing functional decomposition;

Instantiation: the component can be instantiated multiple times in one design context;

Multi disciplinary support: the component provides multi-disciplinary data;

Interface concept: the components exposes interfaces so it can be easily integrated into the overall mechatronics sequence of operations and the inner state can be controlled by the super ordinary mechatronics system; and Library concept: the components are maintained in a reuse library in a client or server data processing system storage and offer an easy "drag-and-drop" mechanism to add to an existing mechatronics system.

Reuse and modularity, in known systems, is generally performed in a disciplinary context. There is no mechanism and design environment available in the art that combines the reuse for multiple disciplines. The reuse of a component today leads to additional efforts for other disciplines to add missing data. This leads to inconsistency of data and more effort for the concept design.

FIGS. 2A-2E illustrate various data that can be stored as part of a mechatronics object corresponding to an exemplary physical part, in accordance with disclosed embodiments. In this example, a mechanical gripper is illustrated.

Note that in a typical implementation, the requirements are part of their structure and linked to functions, and a function tree can include a representation of the actual requirements from the requirements structure linked to a specific function, and not a property of the function objects themselves.

A mechatronic object can include a functional decomposition that describes one or more functions of the object. For example, a functional decomposition for the gripper shown in FIG. 2A could include a main function of "gripper unit", and subfunctions of "move vertically" and "grip gear". The mechatronic object can be used to store functional components such as the discipline-independent aspects of the system defining what functions must be implemented by the different discipline specific models, and does not necessarily carry the details of a single specific implementation of each function.

Figure 2A:
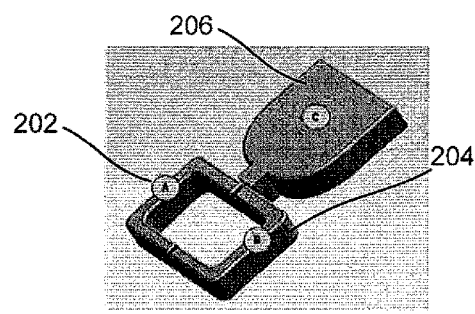
FIGS. 2A-2E illustrate various data that can be stored as part of a mechatronics object corresponding to an exemplary physical part, in accordance with disclosed embodiments.

A mechatronic object can include rough geometries or sub-assemblies for the object. FIG. 2A illustrates gripper A 202, gripper B 204, and slider C 206, all part of the overall gripper assembly.

Figure 2B:
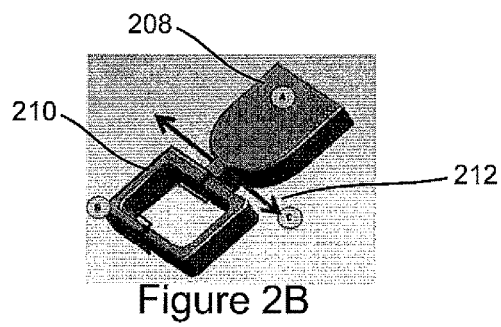

A mechatronic object can include physics information for the object. FIG. 2B illustrates mass 208, collision shape 210, and kinematics/sliding joint 212.

Figure 2C:
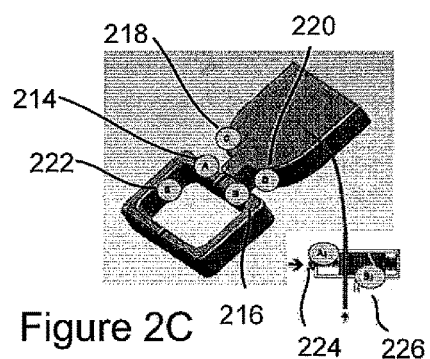

A mechatronic object can include actuator/sensor and other information for the object. FIG. 2C illustrates pneumatic gripper A 214 and related gripper valve A1 224, pneumatic gripper B 216 and related gripper valve B1 226 as actuators. FIG. 2C also illustrates proximity sensor C 218 for gripper A 214, proximity sensor D 220 for gripper B 216, and proximity sensor E 222 for the overall workpiece.

Figure 2D:
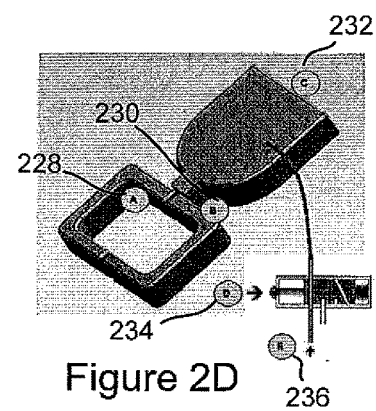

A mechatronic object can include mechanical interfaces, electrical interfaces, pneumatic interfaces, programming interfaces, and other interfaces for the object. FIG. 2D illustrates electrical interfaces including interfaces for proximity sensor A 228 for the workpiece, proximity sensor B 230 for gripper position, and electrical control of the valve D 234. FIG. 2D illustrates mechanical interface C 232 for the mating condition to position for the workpiece. FIG. 2D illustrates pneumatic interfaces such as the pneumatic power interface E 236. FIG. 2D illustrates programming interfaces such as a "workpiece gripped" for proximity sensor A 228, "gripper closed" for proximity sensor B 230, and "open gripper" for valve D 234.

Figure 2E:
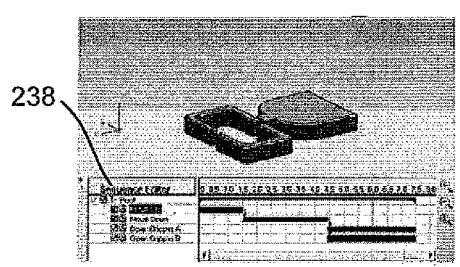

A mechatronic object can include operations data and other information for the object. FIG. 2E illustrates such operations 238 as "move up", "move down", "open gripper A", and "open gripper B".

Figure 3:
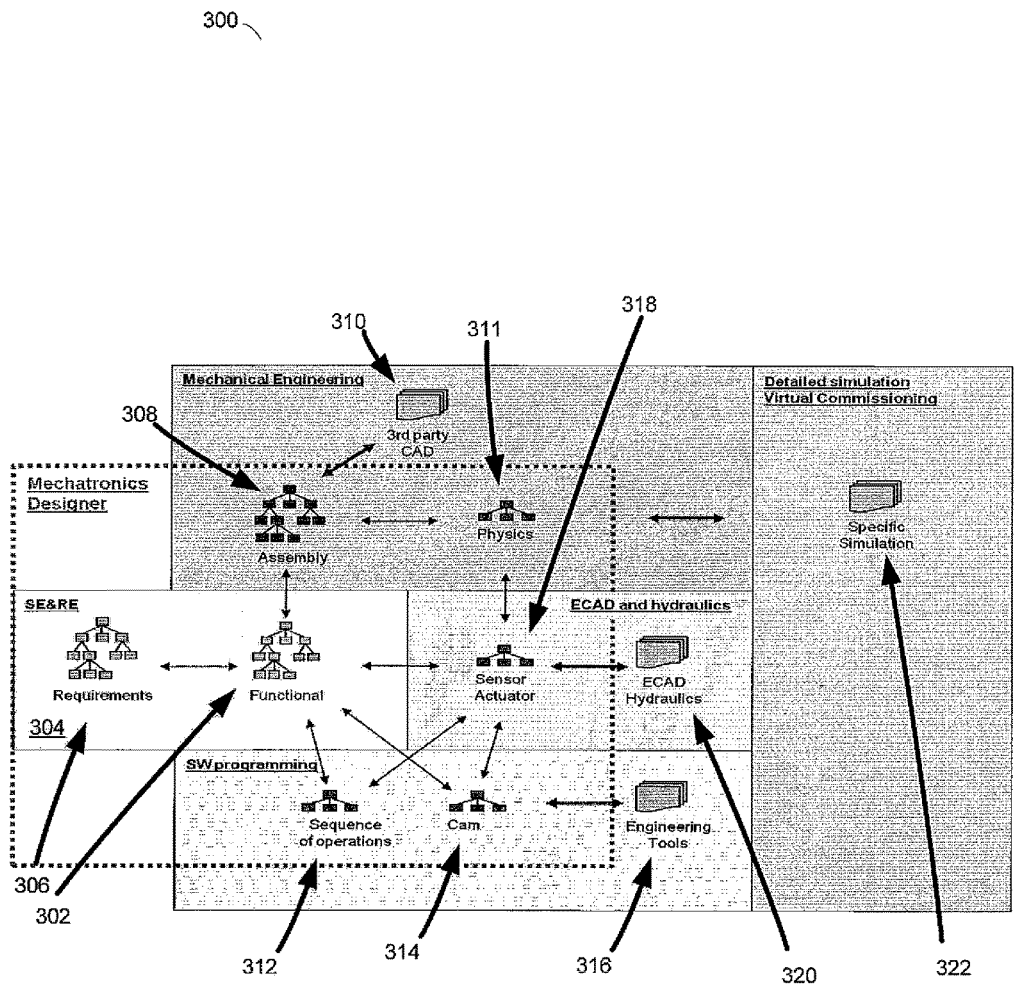
FIG. 3 depicts a block diagram of the different types of data that can be combined in a functional component of a mechatronics object in accordance with disclosed embodiments.

FIG. 3 depicts a block diagram 300 of the different types of data that can be combined in a functional component of a mechatronics object as described herein. The functional component 302 can be used to store the discipline-independent aspects of the system defining what functions must be implemented by the different discipline specific models, and does not necessarily carry the details of a single specific implementation of each function.

Functional component 302, shown as part of systems engineering and requirements engineering (SE & RE) block 304, is linked to requirements 306 as described above. Functional component 302 can include Mechanical Engineering assembly data 308, which itself can include CAD data 310 and physics data 311.

Functional component 302 can also include software programming elements such as sequence of operations 312 and CAM data 314, which can be created using and linked to engineering tools 316. As described above, these elements typically describe or define the functional requirements for the element, not a specific implementation. For example, the component can include a specification which defines the sequence of operations 312, but may not include the specific sequence of operations or coding for any specific implementation.

Functional component 302 can also include ECAD and hydraulics information such as sensor/actuator data 318, which can be linked to ECAD/Hydraulics data 320. As another example of how the functional component 302 will typically include specification and definitional data as opposed to implementation-specific data, for sensors and actuators, the functional component 302 defines what sensing and actuation functions are needed, but need not define in detail the sensors and actuators.

Functional component 302 can be stored and used for a detailed simulation and for virtual commissioning, in one or more specific simulations 322.

As described above, according to various embodiments, the functional component 302 is a definition of what the system or product must do in enough detail to allow the different disciplines to work in parallel on detailed design but without discipline specific design information. This design information can be added as part of creating the product-specific mechatronic object as described in the process of FIG. 4, for example, as product-specific specifications.

According to various embodiments, the system can store the assignment of requirements to functions and from functions to modules and components. The system can store a set of operations defining the functions and can simulate them to verify their correctness. Various operations are linked to the functions. The system can therefore generate and store a set of specifications for the mechanical/electrical/automation engineers in the form of required movements (including speeds, accelerations, vectors, timing, 3D clearances), any of which can be executed in a simulation. This shortens the product development lifecycle by allowing more parallel development.

Figure 4:
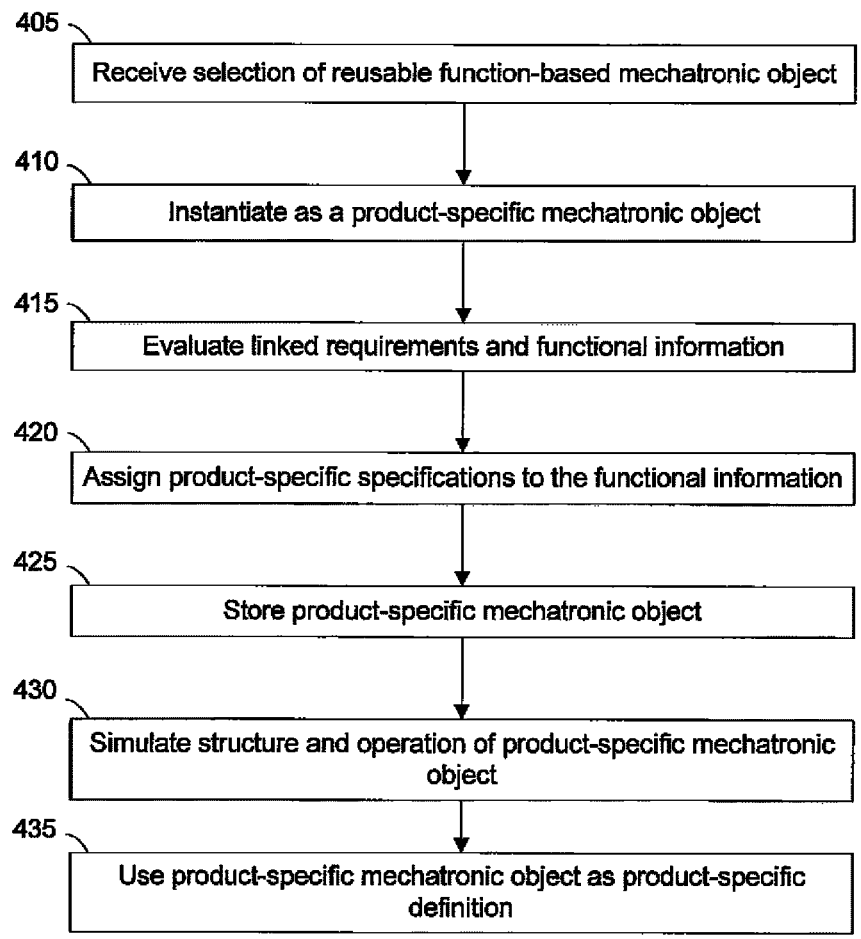
FIG. 4 depicts a flowchart of a process in accordance with disclosed embodiments.

FIG. 4 depicts a flowchart of a process in accordance with disclosed embodiments.

The system receives a selection of a reusable function-based mechatronic object for a product to be designed (step 405). In some cases, the mechatronic object will correspond to a product. A "product" can be a complete physical product or any other physical assembly or subassembly unless otherwise indicated. Receiving, as used herein, can include receiving via an interaction with a user, loading from a storage, receiving from another device or system, for example over a network, or otherwise.

The mechatronic object can include such functional information as physics definitions, sensor and actuator definitions, function and logic definitions, and other such mechanical, electrical, automation, or other definitions and data as described herein. The reusable function-based mechatronic object can be stored, for example, in a library of such objects that can be re-used for multiple product-specific mechatronic objects.

The system instantiates the reusable function-based mechatronic object as a product-specific mechatronic object corresponding to the product to be designed (step 410). This can include making a copy of the reusable function-based mechatronic object for the specific implementation, or otherwise creating a product-specific instance of the mechatronic object, and preferably does not make any changes to the reusable function-based mechatronic object.

The system evaluates a plurality of linked requirements and functional information for the product-specific mechatronic object (step 415).

The system assigns product-specific specifications to the functional information (step 420). The step can be performed as a user interaction to define mechanical, electrical, automation, and other specifications for one or more of the functions, to meet the requirements for the mechatronic object and for the product-specific implementations. This step, and other steps described herein, may be performed repeatedly on an iterative or concurrent basis. In particular embodiments, multiple users or teams of users can interact with the system to define the appropriate specifications for various technical disciplines to customize the reusable mechatronic object to a fully-defined mechatronic object for the specific implementation.

The system stores the product-specific mechatronic object, including the linked requirements and functions with the product-specific specification (step 425). Optionally, if the product-specific mechatronic object may also be re-used in other products or assemblies, it can be stored in a library with other such objects.

The system can simulate the structure and operation of the product-specific mechatronic object (step 430).

The stored mechatronic object can then be used, for example, as a product-specific definition in a product lifecycle management or other system, either as an individual product or as part of a larger assembly (step 435).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for creation of a mechatronics object, comprising:
    receiving a selection of a function-based mechatronic object in a data processing system, the function-based mechatronic object including a plurality of linked requirements and functional information;
    instantiating the function-based mechatronic object as a product-specific mechatronic object by the data processing system;
    evaluating a plurality of linked requirements and functional information for the product-specific mechatronic object by the data processing system;
    assigning product-specific specifications to the functional information of the product-specific mechatronic object by the data processing system; and
    storing the product-specific mechatronics object, including the linked requirements and functions, in the data processing system.

2. The method of claim 1, wherein the product-specific specifications include physics specifications, including at least one of a mechanical interface, an electrical interface, and a pneumatic interface.

3. The method of claim 1, wherein the product-specific specifications include electrical specifications, including actuator and sensor information.

4. The method of claim 1, wherein the product-specific specifications include automation specifications.

5. The method of claim 1, further comprising simulating the structure and operation of the product-specific mechatronics object, including sub assemblies, kinematics, and dynamics.

6. The method of claim 1, wherein assigning product-specific specifications to the functional information of the product-specific mechatronic object is performed via an interaction with at least one user.

7. The method of claim 1, further comprising using the product-specific mechatronic object as a reusable product definition in a product lifecycle management system.

8. A data processing system comprising a processor and accessible memory, the data processing system particularly configured to perform the steps of:
    receiving a selection of a function-based mechatronic object, the function-based mechatronic object including a plurality of linked requirements and functional information;
    instantiating the function-based mechatronic object as a product-specific mechatronic object;
    evaluating a plurality of linked requirements and functional information for the product-specific mechatronic object;
    assigning product-specific specifications to the functional information of the product-specific mechatronic object; and
    storing the product-specific mechatronics object, including the linked requirements and functions.

9. The data processing system of claim 8, wherein the product-specific specifications include physics specifications.

10. The data processing system of claim 8, wherein the product-specific specifications include electrical specifications.

11. The data processing system of claim 8, wherein the product-specific specifications include automation specifications.

12. The data processing system of claim 8, wherein the data processing system is also configured to perform the step of simulating the structure and operation of the product-specific mechatronics object.

13. The data processing system of claim 8, wherein assigning product-specific specifications to the functional information of the product-specific mechatronic object is performed via an interaction with at least one user.

14. The data processing system of claim 8, wherein the data processing system is also configured to perform the step of using the product-specific mechatronic object as a reusable product definition in a product lifecycle management system.

15. A non-transitory computer-readable medium encoded with computer-executable instructions that, when executed, cause a data processing system to perform the steps of:
   receiving a selection of a function-based mechatronic object, the function-based mechatronic object including a plurality of linked requirements and functional information;
   instantiating the function-based mechatronic object as a product-specific mechatronic object;
   evaluating a plurality of linked requirements and functional information for the product-specific mechatronic object;
   assigning product-specific specifications to the functional information of the product-specific mechatronic object; and
   storing the product-specific mechatronics object, including the linked requirements and functions.

16. The computer-readable medium of claim 15, wherein the product-specific specifications include physics specifications.

17. The computer-readable medium of claim 15, wherein the product-specific specifications include electrical specifications.

18. The computer-readable medium of claim 15, wherein the product-specific specifications include automation specifications.

19. The computer-readable medium of claim 15, further encoded with instructions that, when executed, cause the data processing system to perform the step of simulating the structure and operation of the product-specific mechatronics object.

20. The computer-readable medium of claim 15, wherein assigning product-specific specifications to the functional information of the product-specific mechatronic object is performed via an interaction with at least one user.

21. The computer-readable medium of claim 15, further encoded with instructions that, when executed, cause the data processing system to perform the step of using the product-specific mechatronic object as a reusable product definition in a product lifecycle management system.

\* \* \* \* \*